(12) United States Patent
Corbett

(10) Patent No.: US 6,942,275 B2
(45) Date of Patent: Sep. 13, 2005

(54) COLLAPSIBLE BED CAP FOR TRUCKS

(76) Inventor: Adrian Corbett, 7283 Alliance Ct., San Diego, CA (US) 92119

( * ) Notice: Subject to any disclaimer, the term of this patent is extended or adjusted under 35 U.S.C. 154(b) by 0 days.

(21) Appl. No.: 10/410,687

(22) Filed: Apr. 10, 2003

(65) Prior Publication Data

US 2004/0201240 A1 Oct. 14, 2004

(51) Int. Cl.7 .................................................. B60P 7/02
(52) U.S. Cl. ............................ 296/100.18; 296/100.16
(58) Field of Search ........................ 296/100.18, 26.04, 296/164, 165, 24.1, 37.6, 102, 104, 105, 167, 175, 100.11, 100.12, 100.16, 100.01

(56) References Cited

U.S. PATENT DOCUMENTS

| | | | | |
|---|---|---|---|---|
| 4,332,265 A | * | 6/1982 | Baker | 296/159 |
| 4,738,274 A | * | 4/1988 | Heath | 135/137 |
| 4,813,734 A | * | 3/1989 | Hoover | 296/100.17 |
| 5,005,896 A | * | 4/1991 | Li | 296/100.18 |
| 5,056,855 A | | 10/1991 | Moravsky | |
| 5,186,513 A | * | 2/1993 | Strother | 296/100.15 |
| 5,238,288 A | | 8/1993 | Chandler | |
| 5,299,849 A | * | 4/1994 | Cook et al. | 296/100.15 |
| 5,353,826 A | * | 10/1994 | Davis, Sr. | 135/88.13 |
| 5,531,497 A | * | 7/1996 | Cheng | 296/100.01 |
| 5,752,736 A | * | 5/1998 | Nodier | 296/100.18 |
| 5,769,482 A | * | 6/1998 | Kirk | 296/100.18 |
| 5,951,092 A | | 9/1999 | Cissell | |
| 6,257,260 B1 | * | 7/2001 | Phillips | 135/88.13 |
| D454,328 S | | 3/2002 | Cornelius | |
| 6,439,646 B1 | * | 8/2002 | Cornelius | 296/164 |

* cited by examiner

Primary Examiner—D. Glenn Dayoan
Assistant Examiner—Greg Blankenship
(74) Attorney, Agent, or Firm—Steins & Associates, P.C.

(57) ABSTRACT

A Collapsible Bed Cap for Trucks is disclosed. The cover has a plurality of collapsible or sectioned ribs extending longitudinally along the length of the bed in order to provide structural rigidity to the cover. The cap or cover is sectional and detachable such that it can be disassembled and/or collapsed and then stored in a single bag. When assembled, the cover has a tight, aerodynamic and aesthetically pleasing material cover to protect truck bed contents from environmental effects. The bed cover further has front and rear arches for strength; these arches are also collapsible for storage. Still further, the cover may be removed from a bed while assembled so that it might be converted into a free-standing awning.

12 Claims, 8 Drawing Sheets

COLLAPSIBLE BED CAP FOR TRUCKS

BACKGROUND OF THE INVENTION

1. Field of the Invention

This invention relates generally to vehicle accessories and, more specifically, to a Collapsible Bed Cap for Trucks

2. Description of Related Art

Utility vehicles such as pickup trucks have become a mainstay of much of the delivery and construction industry. Many homeowners have also found the value in having an open-bedded utility vehicle. Once problem with pickups is that the open-topped bed permits the materials being carried to be exposed to the environment and/or to unauthorized individuals.

In order to cure this, hard covers and caps have been developed to seal the truck beds. The problem with these hard covers and caps is that they become permanent additions to the vehicle, thereby defeating the purpose of having an open bed. In response, there have been one or two devices created that can provide temporary covers for pickup truck beds. One example is the "camper top" described in Cornelius, U.S. Pat. No. 6,439,646, depicted in FIG. 1.

Figure 1:
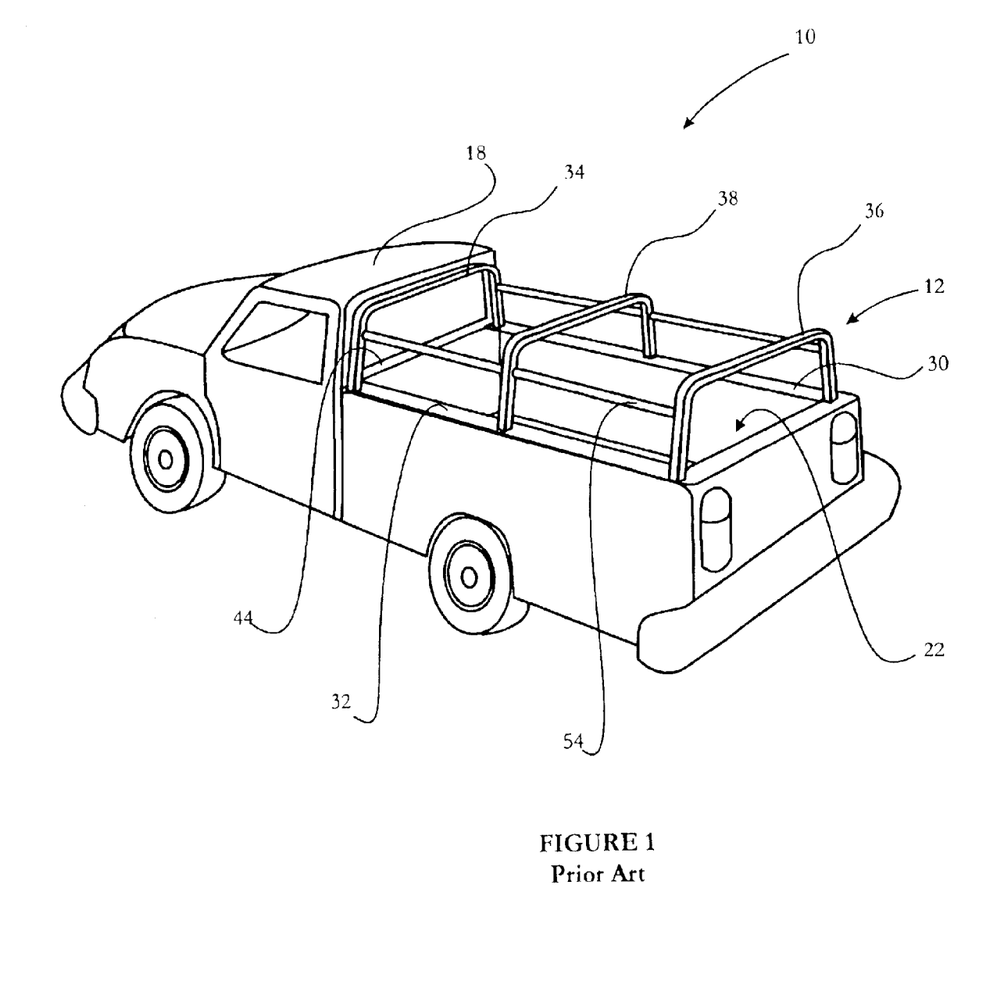
FIG. 1 perspective view of the Cornelius "camper top" installed on a conventional pickup truck.

The Cornelius "camper top" 10 is a lightweight assembly for attachment to the bed 22 of a conventional pickup truck 18. The "top" 10 consists of a "space frame" 12 over which a (presumably) weatherproof skin of material is installed (not shown). The "frame" 12 consists of a pair of "longitudinal rails" 30 and 32, and a "head rail" 44 that are attached to the upper edges of the bed 22. Extending upwardly and interconnecting the "longitudinal rails" 30 and 32 are a "front hoop" 34, and "intermediate hoop" 38, and a "rear hoop" 36. The three "hoops" are interconnected to one another by a plurality of "spreader bars" 54.

The problem with the Cornelius "camper top" 10 is that it is not collapsible, and therefore suffers from similar deficiencies as the prior hard-shelled tops, namely that it either must become a permanent addition to the truck 18, or it must be stored in an assembled state (which consumes a large amount of space). What is needed is a bed cap for pickup trucks that is lightweight, durable, yet collapsible as well, such that when not in use, it occupies a little storage space as possible.

SUMMARY OF THE INVENTION

In light of the aforementioned problems associated with the prior devices, it is an object of the present invention to provide a Collapsible Bed Cap for Trucks. The cover should have a plurality of collapsible or sectioned ribs extending longitudinally along the length of the bed in order to provide structural rigidity to the cover. The cap or cover should be sectional and detachable such that it can be disassembled and/or collapsed and then stored in a single bag. When assembled, the cover should have a tight, aerodynamic and aesthetically pleasing material cover to protect truck bed contents from environmental effects. The bed cover should have front and rear arches for strength; these arches should also be collapsible for storage. Furthermore, the cover should be removable from a bed while assembled so that it might be converted into a free-standing awning.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Collapsible Bed Cap for Trucks.

Figure 2:
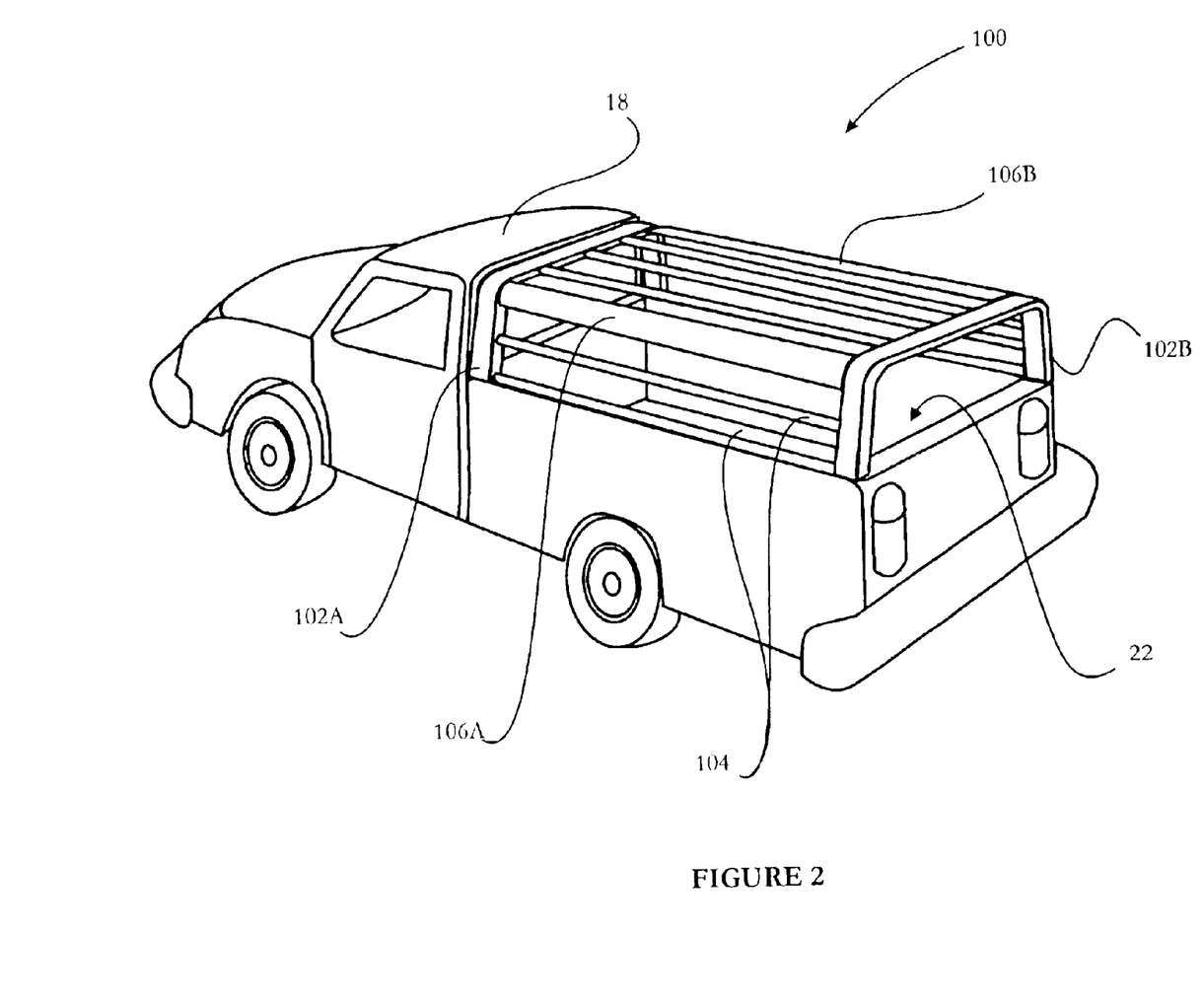
FIG. 2 is a perspective view of the collapsible frame of the present invention assembled and installed on a conventional pickup truck.

The present invention can best be understood by initial consideration of FIG. 2. FIG. 2 is a perspective view of the collapsible frame 100 of the present invention assembled and installed on the bed 22 of a conventional pickup truck 18. It should be understood that the cover sheet for the frame 100 that completes the bed cap is not shown here in order to best illuminate the structure of the device.

The frame 100 comprises a front and rear arch assembly 102A and 102B, positioned at the front and rear ends of the bed 22, respectively. The arch assemblies 102 are interconnected by a plurality of longitudinal ribs 104 attached to and extending therebetween. The frame 100 further comprises a pair of corner assemblies 106A and 106B extending between the front arch assembly 102A and the rear arch assembly 102B. As will be repeated below, each of the aforementioned elements are collapsible such that the frame 100 can be removed from the bed 22, the elements be collapsed, and all parts stored in a single, condensed storage bag. Now turning to FIGS. 3 and 4, we can examine the details of the arch assemblies.

Figure 3:
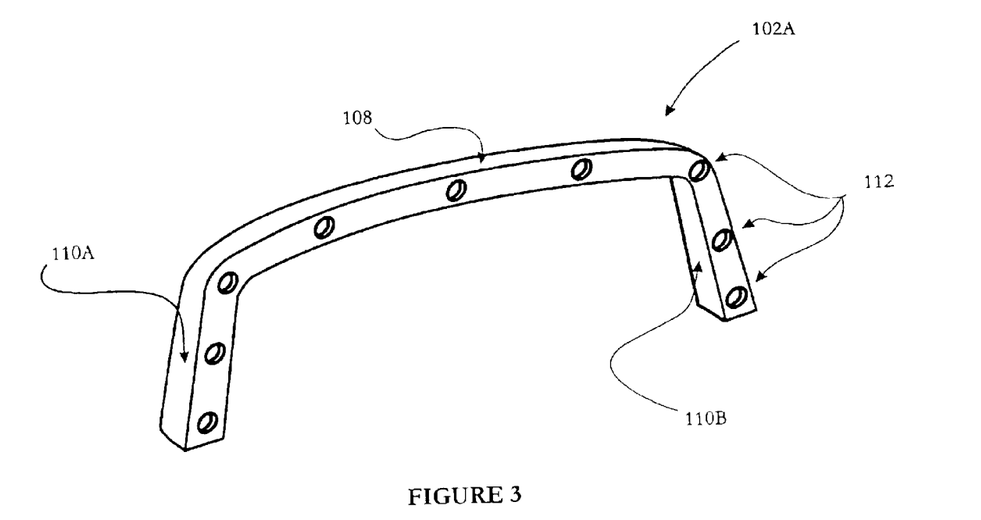
FIG. 3 is a perspective view of a front arch assembly of the embodiment of FIG. 2.
Figure 4:
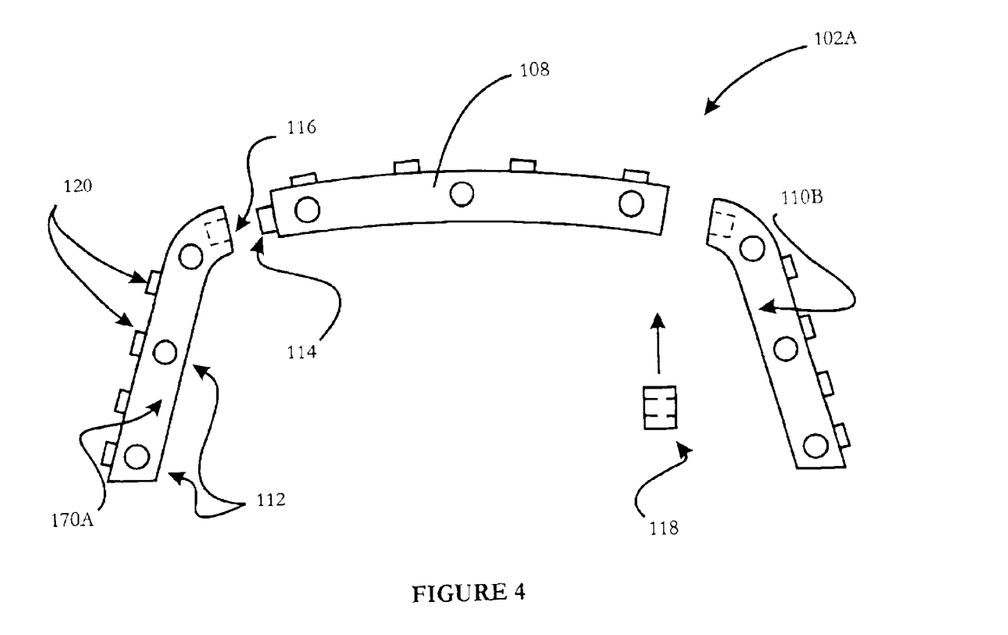
FIG. 4 is a partially exploded front view of the arch assembly of FIG. 3.

FIG. 3 is a perspective view of a front arch assembly 102A of the embodiment of FIG. 2. The assembly 102A is arch-shaped to reach from the left to the right side of the truck bed. The assembly 102A comprises a top segment 108 and a pair of side segments 110A and 110B on the right and left sides. On the backward-facing face of the assembly 102A are disbursed a plurality of bores 112 for releasibly accepting the ribs and corner assemblies discussed above in connection with FIG. 2. The assembly components are preferably constructed from a lightweight material, such as plastic or aluminum. FIG. 4 provides further detail regarding the arch assemblies 102.

FIG. 4 is a partially exploded front view of the front arch assembly 102A of FIG. 3. As shown, the side segments 110 are detachable from the top segment 108 in order to provide the collapsible functionality. The top segment 108 has a pair of pins 114 extending therefrom in opposing directions outward from the ends of the top segment 108. The pins 114 are cooperatively designed with sockets 116 formed in the top ends of each side segment 110 to be accepted therein. Along the outer face of all three segments 108 and 110 are disbursed a plurality of attachment means 120, such as conventional snaps, hook-and-loop fasteners, or other devices. The attachment means 120 are provided to retain the cover sheet (not shown) snugly to the outer surface of the arches 102.

In order to easily accommodate a variety of bed widths (i.e. for different manufacturers' trucks), spacer members 118 may be provided to be placed onto the pins 114 between the top and side segments 108 and 110. The insertion of the spacer members 118 will provide additional width to the standard bed cover without the need for additional modification. It should be apparent that the rear arch assembly is essentially identical in design to the front arch assembly 102A, except that the bores 112 are directed towards the front of the bed, rather than towards the rear as here. If we now turn to FIG. 5, we can continue discussion of the novel elements of the present invention.

Figure 5:
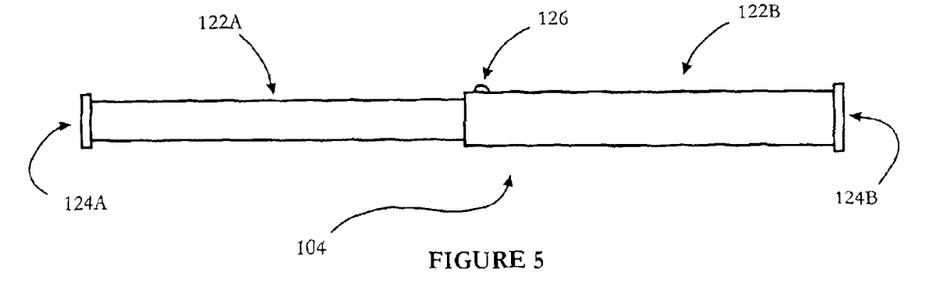
FIG. 5 is a side view of a rib of the embodiment of FIG. 2.

FIG. 5 is a side view of a rib 104 of the embodiment of FIG. 2. These ribs 104 are designed to be lightweight and collapsible. To this end, the ribs 104 are telescoping; when collapsed, they are approximately one-half their extended length. The ribs 104 each comprise an inner tube 122A, which is retractable into an outer tube 122B. When the inner tube 122A is extended, it is held in place by a conventional spring-loaded ball detent mechanism 126. In order to collapse the rib 104, it is a simple matter to depress the ball of the ball detent mechanism 126, and then to slide the inner tube 122A into the outer tube 122B. Each of the tubes 122 has an end plate 124 attached to its distal end. The end plates 124 are provided to engage the bores (see FIGS. 3, 4, 5 and 6) to firmly retain the ribs 104 to the two arch assemblies (see FIG. 2). Now turning to FIGS. 6 and 7, we can examine this structure.

Figure 6:
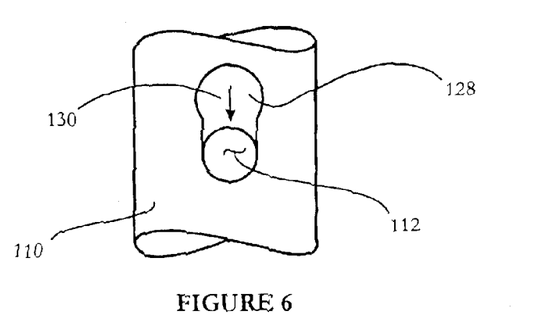
FIG. 6 is a partially front view of an arch segment of the assembly of FIGS. 3 and 4.
Figure 7:
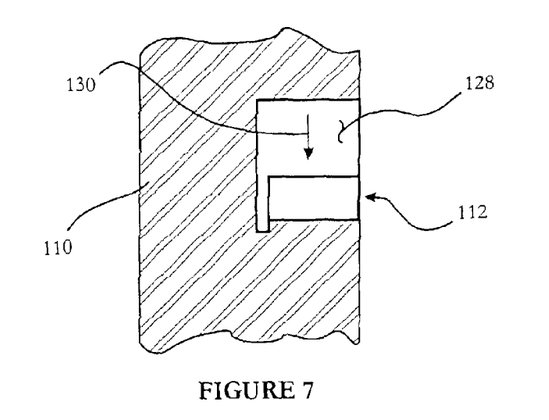
FIG. 7 is a partial cutaway side view of the arch segment portion of FIG. 6.

FIG. 6 is a front view of a section of an arch segment of the assembly of FIGS. 3 and 4. The bores 112 formed in the arches are designed to cooperate with the end plates provided at each rib such that the end plates insert into an elliptical slot 128, after which the rib is slid down in the engagement direction 130 until it is locked in place within the bore. In order to remove the rib from the arch, the rib need simply be forced in the direction opposite to the engagement direction 130 until the end plate will be permitted to be pulled out though the slot 128. FIG. 7 is a partial cutaway side view of the arch segment portion 110 of FIG. 6. As you can see in more detail here, the slot 128 defines an enlarged portion adjacent to the bore 112; it is sized to accept the end plate therewithin until the end plate/rib is slid into the bore 112, after which the end plate is firmly retained in place.

In another embodiment, the ribs 104 (see FIG. 5) will simply have the ball detent arrangement at their ends, rather than the depicted end plates 124. In this embodiment, the slot-and-bore arrangement in the arch segments will be unnecessary (see FIGS. 6 and 7), and the arch segments will simply include bores formed therein to accept the rib ends, as well as apertures or depressions in the wall of the bore that will cooperate with the springloaded balls extending outwardly from the ends of the ribs. Furthermore, in yet another embodiment, the ribs (see FIG. 5) will be sectional rather than telescoping; in other words, each rib will comprise two or more detachably interconnected segments that can be dismantled from one another for collapsing. This embodiment provides the desired collapsibility while reducing the cost of the ribs. We shall now turn to FIG. 8 to examine how the assembly attaches to the truck bed.

Figure 8:
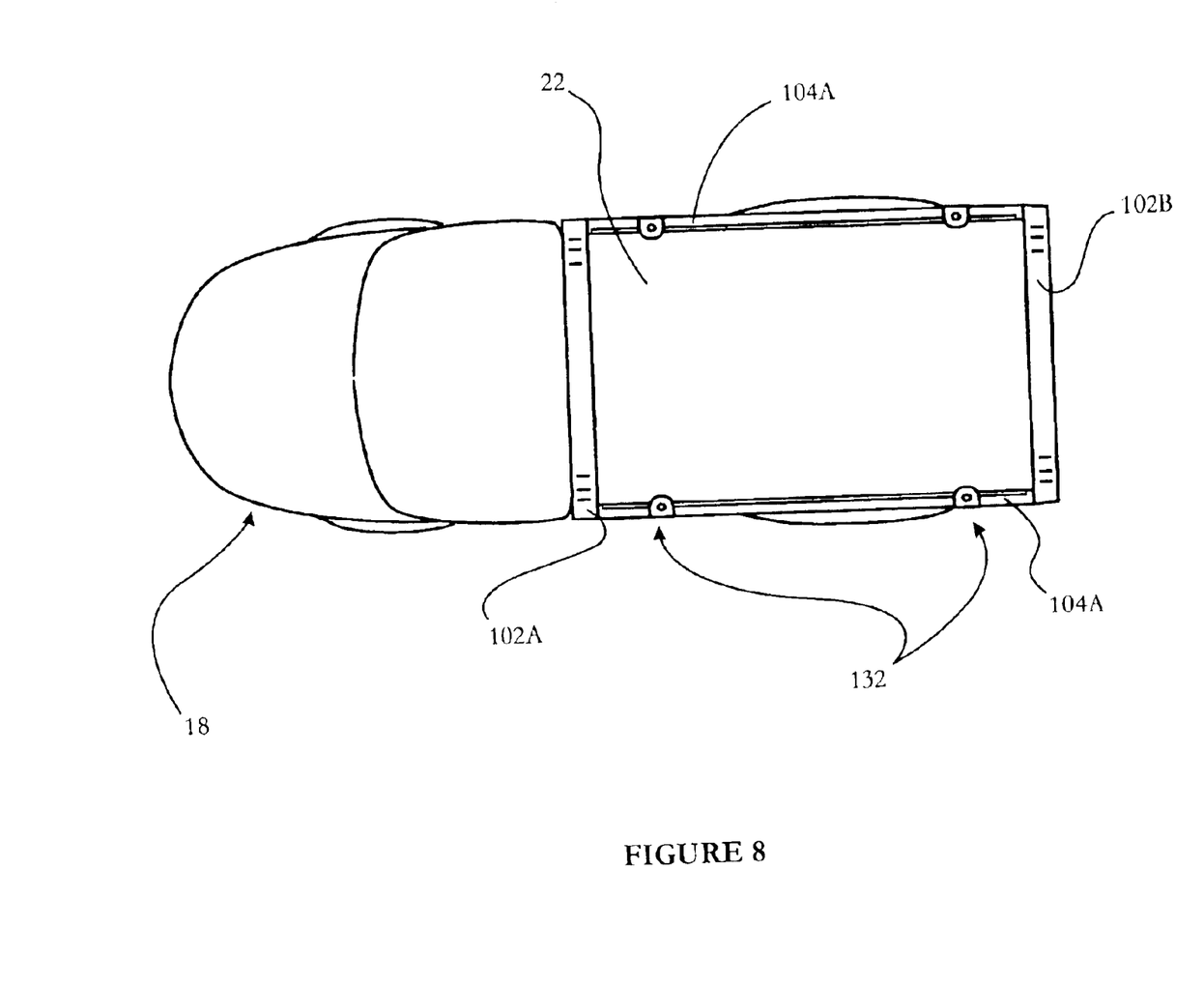
FIG. 8 is a top view of portions of the frame of FIG. 2 attached to a truck bed.

FIG. 8 is a top view of portions of the frame of FIG. 2 attached to a truck bed 22. The front and rear arch assemblies 102 are actually held in their respective places by ribs 104. The ends of the ribs 104 are inserted into bores (see above) formed in the arch assemblies 102, and then the two lowest ribs 104 are attached to the rim of the bed 22. The bottom longitudinal ribs 104 are attached to the bed 22 at two or more points by bed clamp assemblies 132, as discussed below in connection with FIG. 9.

Figure 9:
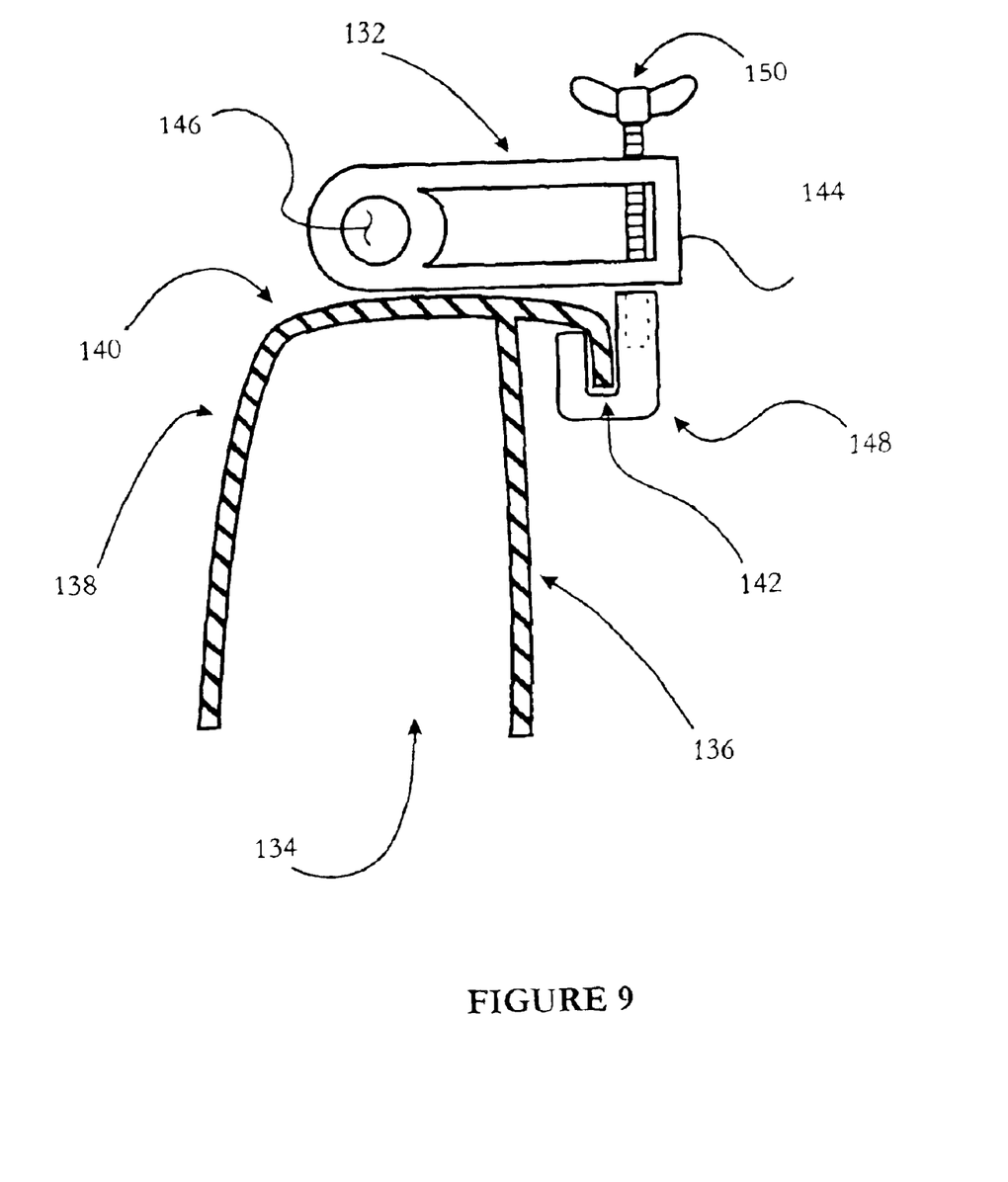
FIG. 9 is a partially cutaway side view of a truck bed wall assembly having a bed clamp assembly of the present invention attached thereto.

FIG. 9 is a partially cutaway side view of a truck bed wall assembly 134 having a bed clamp assembly 132 of the present invention attached thereto. The truck bed depicted here has an inner wall 136 and an outer wall 138, which meet at the top to form a rim 140 and a lip 142. While a double-walled bed wall assembly 134 is pictured here, it is not meant to limit the application of the present invention to such designs; the device will work just a suitably on a single-walled bed.

Figure 10:
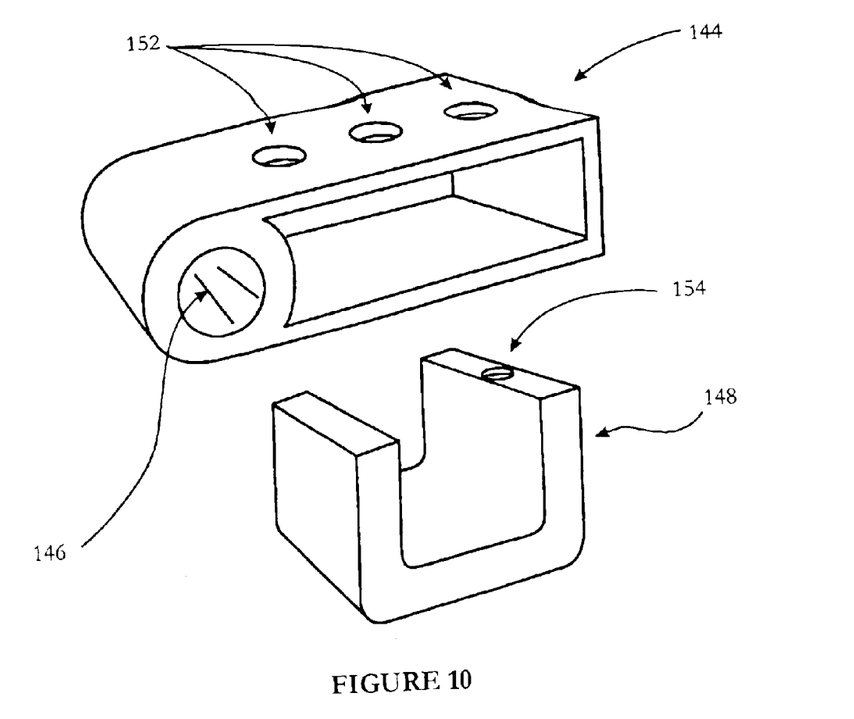
FIG. 10 is a partially exploded perspective view of the bed clamp assembly of FIG. 9.

As shown, each bed clamp assembly 132 releasibly attaches to the rim 140 of the bed by operation of a U-shaped member 148 engaging the lip 142 of the bed. The U-shaped member is attached to a rib-retaining member 144 by a bolt 150, such as the "butterfly" bolt shown here. The bolt 150 is in threaded engagement with the U-shaped member 148. The rib-retaining member includes a rib bore 146 formed therethrough for accepting (and clamping down) a rib therein. Clearly, when the bolt 150 is tightened sufficiently, the rib residing in the rib bore 146 will be clamped securely to the rim 140 where the U-shaped member 148 engages the lip 142. FIG. 10 seeks to further clarify the design.

FIG. 10 is a partially exploded perspective view of two parts of the bed clamp assembly 132 of FIG. 9. As discussed above, the U-shaped member 148 has a threaded bore 154 formed therein to engage the bolt (see above). Correspondingly, there are a plurality of apertures 152 formed in the rib-retaining member 144 through which the bolt (see above) can pass in order to engage the U-shaped member 148. The different apertures correspond to different truck bed and lip designs; the user need simply select the aperture for the bolt that best fits with his or her vehicle.

Figure 11:
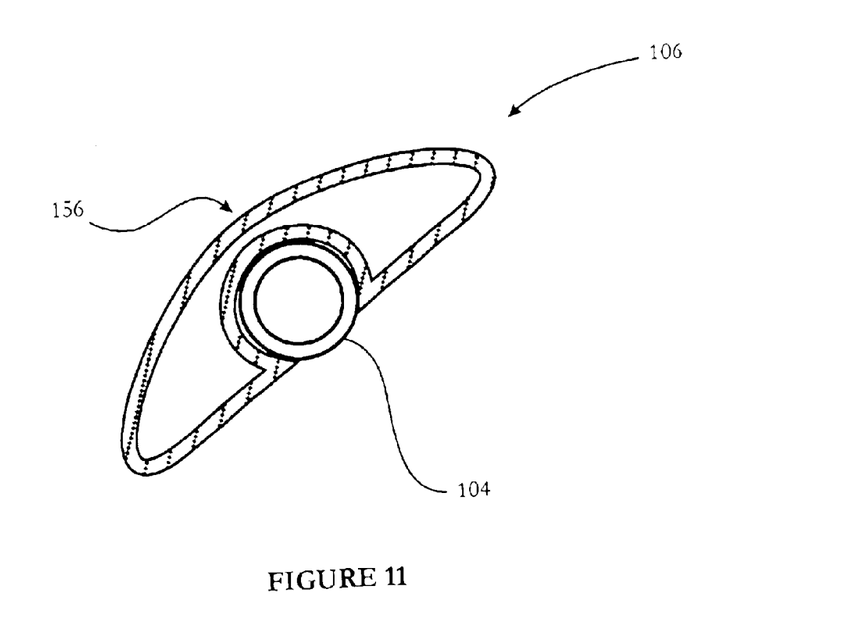
FIG. 11 is a cutaway side view of a corner member of the frame of FIG. 2.

FIG. 11 is a cutaway side view of a corner member 156 of the frame of FIG. 2. The corner members 156 are provided to give the edges of the assembled cover rounded edges, for the purposes of durability, aesthetic attractiveness, and reduced aerodynamic drag. The corner members 156 are usually broken up into two or three segments along the longitudinal length of the cover so that they can pack easily when the cover is collapsed. Each member 156 comprises an inner bore configured to accept a rib 104 therein, either by sliding the rib 104 into the end of the member 156, or by simply snapping it in from the concave inside surface of the member 156. When the cover is collapsed, the corner member encasing the outer tube of the rib (see FIG. 5) may be left on the tube; the corner member encasing the inner tube of the rib 104 is simply slipped off prior to retracting the inner tube into the outer tube. In their preferred form, the corner members 156 will be made from molded or extruded plastic or other lightweight, durable material. Finally turning to FIG. 12, we can examine how the cover for the frame attaches to the frame.

Figure 12:
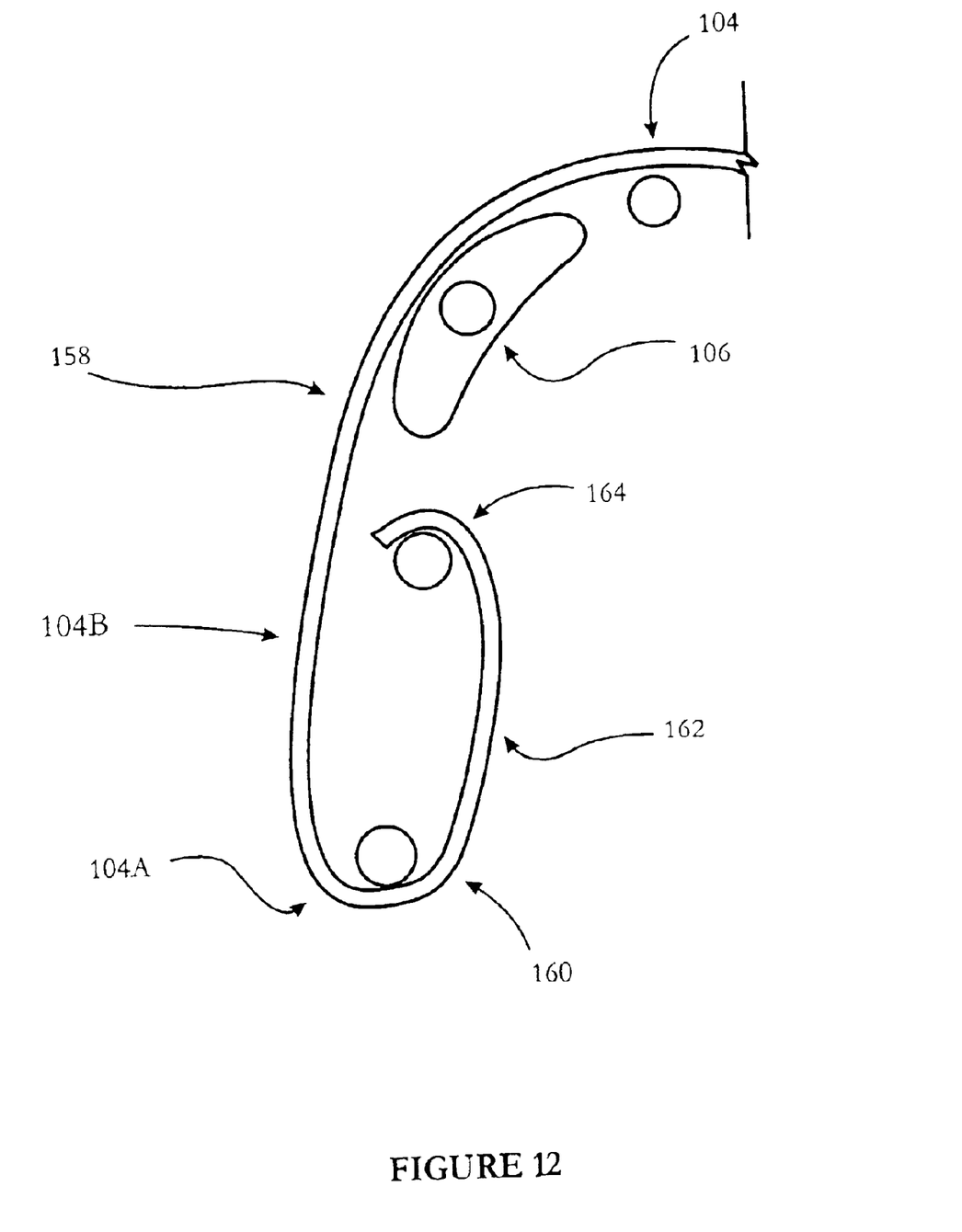
FIG. 12 is a cutaway side view of a cover sheet attached to a portion of the frame of FIG. 2.

FIG. 12 is a cutaway side view of a cover sheet attached to a portion of the frame of FIG. 2. The cover sheet 158 is made from a substantially rectangular sheet of durable material that is typically weather-resistant. As discussed above, it will attach at its front and rear edges (not shown) to the front and rear arches (see FIG. 2) by a plurality of attachment means disbursed along these edges (e.g. snaps, hook-and-loop fasteners, etc.). The section between the front and rear arch assemblies will attach to the frame by wrapping under the bottom ribs 104A (also FIG. 8) and then attaching to the next rib 104B above the bottom rib 104A. The edge of the sheet 160 (i.e. the longitudinal edge) has a plurality of straps 162 dispersed along its length; these are conventional "bungee cords" or other strap mechanism adequate to provide biasing force on the edge 160 such that the sheet 158 is held in a taut condition over the frame. The sheet 158 is sized such that there is sufficient overextension of the edge 160 (i.e. beyond the bottom rib 104A) to accommodate wider truck beds. At the end of each strap 162 is a hook 164 for hooking over the rib 104B. This design has proven to provide a sleek and smooth outer surface to the bed cover that inhibits flapping even in strong winds.

Referring to FIG. 2, it should also be understood that in some versions, detachable front and rear covers will be provided to substantially cover over the openings created at the front arch assembly and the rear arch assembly; these front and rear covers will be made from flexible, durable (and possibly transparent) material.

As an added beneficial mode of use, it has been demonstrated that once assembled, the cover can be removed from the truck bed by easily loosening the bed clamp assemblies (see FIG. 9). Next, four of the ribs can be snapped out of the front and rear arch assemblies, and they can be reinserted into vertical bores formed in the bottom of the side segments of the arch assemblies. Doing this creates a free-standing (and easily collapsible) awning for use at picnics and other outdoor gatherings. When the gathering is finished, the ribs can be reinserted into their normal position interconnecting the front and rear arch assemblies, and the cover can be reattached to the truck bed.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An enclosure for a bed of a pickup truck, the bed defining a rectangular box having an open top and a rim on opposing longitudinal sides, the enclosure comprising:
   a frame, said frame comprising:
      a rear arch assembly and a front arch assembly, each said assembly comprising a pair of side segments detachably attachable to a top segment each said arch assemblies further define an outwardly-facing surface, said assemblies further comprising attachment means dispursed in spaced relation along said outwardly-facing surface;
      a left lower rib attachable to said bed at said rim and a right lower rib attachable to said bed at said rim;
   a cover sheet attachable to said front and rear arch assemblies; and
   wherein said lower ribs are attachable to said rim by bed clamp assemblies, said bed clamp assemblies comprising:
      a rib retaining member for retaining a portion of one said lower rib therein;
      a u-shaped member for engaging said rim; and
      a bolt passing through an aperture formed in said rib retaining member and threadedly engaging a threaded aperture formed in said u-shaped member.

2. The enclosure of claim 1, further comprising:
   right and left corner ribs defined by opposing ends, one of said ends of each said rib attachable to said front arch assembly and one said end of each said rib attachable to said rear arch assembly;
   a left corner member encasing at least a portion of said left corner rib; and
   a right corner member encasing at least a portion of said right corner rib.

3. The enclosure of claim 2 comprising at least two top ribs defined by opposing ends, one of said ends of each said rib attachable to said front arch assembly and one said end of each said rib attachable to said rear arch assembly.

4. The enclosure of claim 3 wherein each said rib comprises an outer tube defining an inner core and an inner tube nestable within said inner core.

5. The enclosure of claim 4, wherein said cover sheet comprises a substantially rectangular sheet of flexible material defined by front and rear edges and left and right edges, said cover sheet further comprising a plurality of attachment means dispersed along said front and rear edges in cooperatively spaced relation to engage said attachment means dispersed along said front and rear arch assemblies.

6. The enclosure of claim 5, wherein said cover sheet further comprises a plurality of straps attached in spaced relation along said right and left edges, each said strap including a hook at the distal end of said strap.

7. The enclosure of claim 6, wherein front arch assembly is defined by a rearwardly facing surface and said rear arch assembly is defined by a frontwardly facing surface, said frontwardly and rearwardly facing surfaces further defined by a plurality of bores penetrating therethrough, said bores configured to accept an end of said ribs therein.

8. An enclosure for attaching to a vehicle having a bed defining a rectangular box having an openable top defined by a rim on opposing longitudinal sides, the enclosure comprising:
   a frame, said frame comprising:
      a rear arch assembly and a front arch assembly, each said assembly comprising a pair of side segments detachably attachable to a top segment;
      a left lower rib attachable to said bed at said rim and a right lower rib attachable to said bed at said rim, wherein said lower ribs are attachable to said rim by bed clamp assemblies, said bed clamp assemblies comprising:
         a rib retaining member for retaining a portion of one said lower rib therein;

a u-shaped member for engaging said rim; and a bolt passing through an aperture formed in said rib retaining member and threadedly engaging a threaded aperture formed in said u-shaped member; and a cover sheet attachable to said front and rear arch assemblies.

9. The enclosure of claim 8, wherein said cover sheet comprises a substantially rectangular sheet of flexible material defined by front and rear edges and left and right edges, said cover sheet further comprising a plurality of attachment means dispersed along said front and rear edges in cooperatively spaced relation to engage said attachment means dispersed along said front and rear arch assemblies.

10. The enclosure of claim 9, wherein said cover sheet further comprising a plurality of swaps attached in spaced relation along said right and left edges, each said strap including a hook at the distal end of said strap.

11. The enclosure of claim 10, further comprising:

right and left corner ribs defined by opposing ends, one of said ends of each said rib attachable to said front arch assembly and one said end of each said rib attachable to said rear arch assembly;

a left corner member encasing at least a portion of said left corner rib; and a right corner member encasing at least a portion of said right corner rib.

12. The enclosure of claim 11 comprising at least two top ribs defined by opposing ends, one of said ends of each said rib attachable to said front arch assembly and one said end of each said rib attachable to said rear arch assembly.

* * * * *